Patented Mar. 12, 1940

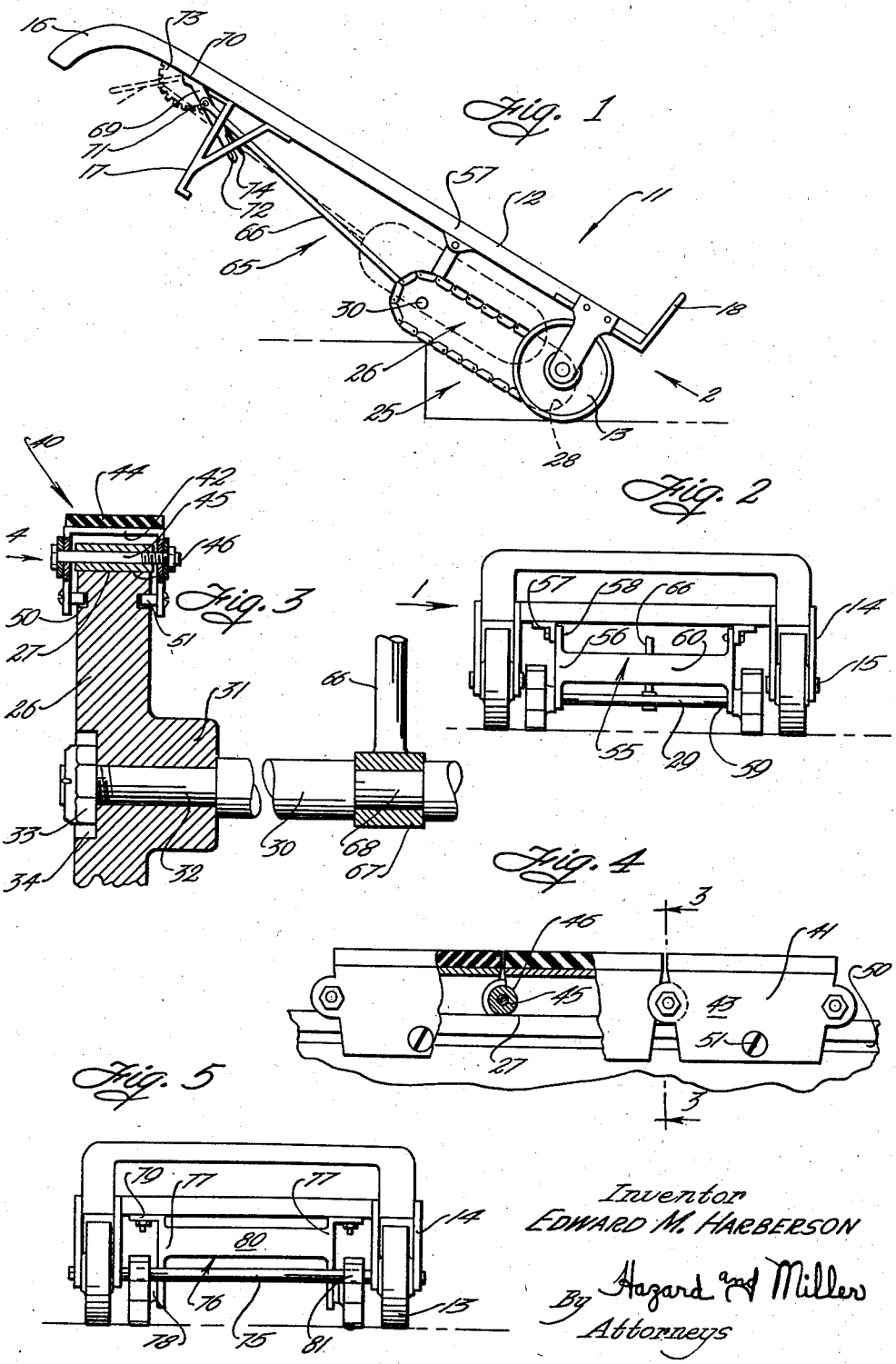

2,193,283

UNITED STATES PATENT OFFICE 2,193,283

HAND TRUCK

Edward M. Harberson, Los Angeles, Calif.

Application December 5, 1938, Serial No. 243,971

18 Claims. (Cl. 280—56)

My invention relates to an improvement of the two-wheeled type of hand truck. This is preferably a so-called light truck such as used by delivery men for moving merchandise from a delivery truck to stores and taking merchandise to be shipped from the stores or warehouses to the truck. With this type of trucking, it is frequently necessary to move the truck up and down over a curb or steps or stairs in a building.

A defect of the present type of hand truck is that it is very difficult to operate the truck up or down a step or a series of steps or over an obstruction of a considerable heighth. One fact contributing to this defect is that the wheels must necessarily be quite small and hence do not readily ride over obstructions such as steps either in going down or up. In lowering a truck down one or more steps, a truck is inclined to bounce downwardly making it difficult for the operator.

An object and feature therefore of my invention is providing the truck with an auxiliary engaging surface which extends from adjacent the wheels towards the handles and will contact the edge of a step such as the edge formed by the riser and the tread or will engage the top or angle of an obstruction. This construction therefore prevents the unpleasant bumping and bouncing of a truck when lowered down a stairway and facilitates pulling the truck up the steps in the elevation of the wheel up the riser.

A further characteristic of my invention is forming the auxiliary engaging or contacting surface in the form of an endless track, this being carried on suitable supports and guides so that when this endless track contacts for instance the edge of a step, the point of the tread in engagement therewith remains stationary and as the truck is moved the tread operates on a circular movement and may carry the whole weight of the load until the wheel passes from the tread of one step to the tread of another step. This operation is performed either in pulling the truck up-steps by the handles, the handles preceding the wheels or in lowering a truck down a series of steps.

In accordance with my invention, I may make the endless track with a retractable mounting as to the truck body by providing a pivoted connection thereto with adjusting and control means. This permits the endless track to be drawn towards the handles and upwardly to fit close underneath the body of the truck and entirely out of position where it would be apt to contact any steps or obstructions. In another form of my invention the frame or guides for the endless track is arranged stationary as to the truck and the endless track when contacting a step or obstruction circles around this fixed guide.

A further characteristic of my invention as to both forms is that in the normal position of the wheels in moving a load on a horizontal floor or on a ramp, the entire weight is carried by the wheels and the endless track has its point which is closest to the ground always above the surface on which the wheels run and operate and the track has a similar clearance from the ground no matter whether the body is in a horizontal position resting on the wheels and the stub legs, however, the clearance need be quite slight when the endless track is in its operative position so that such track readily engages an obstruction such as the edge of a step and thus may be used to ease the truckload either down or up the steps or over an obstruction.

My invention is illustrated in connection with the accompanying drawing in which:

Fig. 1 is a side elevation of a conventional hand truck with my invention applied thereto taken in the direction of the arrow 1 of Fig. 2. This illustration presents the retractable type of endless track.

Fig. 2 is a front end elevation taken in the direction of the arrow 2 of Fig. 1.

Fig. 3 is a detail section on the line 3—3 of Fig. 4 through a portion of the endless track and the guide frame for such track illustrating the axle forming a mountaing for the endless track frame and guides.

Fig. 4 is a partial side elevation on an enlarged scale of part of the endless track as viewed in Fig. 1 or in the direction of the arrow 4 of Fig. 3, in both cases parts being broken away.

Fig. 5 is an end view such as Fig. 2 of a modification in which the guide frame for the endless track is fixed.

In my invention the conventional truck designated as 11 has a load carrying portion of the frame 12, wheels 13 which in this case are indicated as connected to the frame 12 by pairs of side plates 14 with an axle 15. The handles 16 are a continuation of the body of the truck and spaced from the hand grip portion of the handles there are sub legs 17. At the opposite end of the load carrying portion there is a blade or end piece 18 utilized to slip under a load to be lifted such as packing cases or the like. In this type of truck the wheels are generally located underneath the truck body in order that the width or tread between the wheels is not excessive and hence the wheels must be quite small compared with the size of the truck and the loads carried. The conventional angle for carrying a load on the usual two wheeled truck is that shown in Fig. 1.

My invention comprehends the endless track assembly and equipment designated 25 and in which I employ guide frame assemblies 26 in the form of elongated panels having parallel upper and lower surfaces designated 27 with curved ends 28. It is on these surfaces that the endless track proper operates. There are two of these side frames both preferably constructed in a similar manner and connected by a forward axle 29 and a rearward axle 30. If desired there may be a hub such as 31 on the inside of each of the frames 26. The axles may have a reduced section 32 extending through the hub and the panel portion 26, these panels being secured to the axles by nuts 33 threaded on the ends of the handles and fitting in recesses 34 in the panels. In my invention I prefer to have two comparatively narrow endless tracks on each side and positioned as close as possible inside of the load wheels 15 but of course my invention comprehends using but a single endless track if this is desired.

The endless track construction designated by the assembly numeral 40 may be constructed of a series of individual links 41, note Figs. 3 and 4. Each of these has a tread plate 42 and two side plates 43. The tread plates have a rubber or similar cover 44. The links are connected by stub axles 45 having rollers 46 thereon. The rollers directly contact the parallel top and lower surfaces 27 of the guide panels and the ends 28. In order to retain the tracks mounted on their panels, each panel has a peripheral groove 50 on its inner and outer face and there are pins 51 extending through the side plates 41 into these grooves, note Figs. 3 and 4. Therefore in the movement of the endless track formed by the chain around the panels or guides, the tracks are prevented from sagging away from the guide and yet roll freely over such guide.

In the manner of attaching the panel guides 26 to the truck body, in the construction of Figs. 1 and 2, I employ a pivoted arm assembly 55 at the front end. This has a pair of pivot arms 56 at each end, both being similar. The upper end of each arm is pivoted to a bracket 57 secured to the underside of the portion 12 of the truck body and connected by pintles 58. The lower ends of these arms have eyes 59 through which the axle 29 extends. Connecting the pivot arms 56 on opposite sides there is a center plate 60 causing these to operate in unison. The rear axle 30 is connected by the same type of pivot connection as 55 shown at the front end of the truck. As viewed in Fig. 1, the forward end arms 56 and the plates 60 are hidden by the side plates 14 which form the mounting for the wheels.

The retracting assembly for the endless track designated 65 includes a long rod 66 connected by an end eye 67 to the axle 30, this preferably having a reduced neck section 68 and the eye being formed with clamps. This link leads to a pivoted hand lever 69 pivoted at 70 to the frame of the truck adjacent the handles 16, the point of connection being indicated by the pivot 71. There is a hand grip end 72 for this lever and the lever swings over a toothed quadrant 73 which may be engaged by a spring operated pawl operated by the finger grip lever 74. This pivot and pawl connection operating over a quadrant is quite common. It will therefore be seen that when the lever arm 69 is in the position shown in full lines in Fig. 1, the endless track assembly is thrust forward as much as possible and when retracted to the dotted line position the endless track assembly is also retracted as regards the wheels 13 and on account of the pivoted connections at 57, is elevated and brought closely contiguous to the underside of the load body 12 of the truck.

In the modified construction of Fig. 5, in this case the truck is illustrated as having a continuous axle 75 extending through the side plates 14 and on which the wheels 13 are mounted. In this case the panels and guides for the endless track are substantially the same as illustrated in connection with Figs. 1 through 4 however instead of using pivoted arms 55, I utilize rigid braces 76, these having arms 77 connected at 78 to the panel 26. The connection may be by a stub shaft employing a short section such as 32. The upper ends of these brackets 79 are bolted to the frame of the truck. The brackets on opposite sides are similar and connected by a cross plate 80 to give rigidity. In this construction the axle 75 being continuous from the two wheels may pass through a slot 81 formed in the panel 26. This slot however clears the pins 51 and the guide slots 50. The endless track in the construction of Fig. 5 occupies substantially the full line position of Fig. 1.

Various changes may be made in the details of the construction without departing from the spirit or scope of the invention as defined by the appended claims.

I claim:

1. In a hand truck including a truck frame with downwardly extending wheels adjacent one end, handles at the opposite end and downwardly extending legs between the wheels and the handles, the combination of an auxiliary supporting structure including a guide frame assembly with a connection to the truck frame, an endless track operating over the guide frame, the track having its lower run positioned substantially parallel to the frame and extending from a position slightly above and rearwardly of the contact of the wheels with a level ground surface whereby the lower run of the endless track in contacting the high point of an obstruction remains stationary as to the point of contact and thereby causing the endless track to move on the guide frames during the movement of the truck over the obstruction.

2. In a hand truck including a truck frame with downwardly extending wheels adjacent one end, handles at the opposite end and downwardly extending legs between the wheels and the handles, the combination of an auxiliary supporting structure including a guide frame, a pivotal connection between the guide frame and the frame of the truck, a pair of endless tracks mounted on each guide frame and located parallel to the plane of the wheels and means to retract the guide frame and to retain such frame in operative or retracted position whereby in the operative position the lower run of the endless track is positioned to engage the high point of an obstruction and when retracted the lower run of the endless track is positioned to be out of contact with an obstruction.

3. In a hand truck assembly including a truck frame occupying substantially a plane and having an end piece substantially at right angles thereto at one end and handles at the opposite end together with a pair of wheels secured to the frame with the axle parallel to the plane of the frame, the wheels being adjacent the end piece combined with a pair of supporting devices connected to the frame, one adjacent the wheels and the other towards the handle, a pair of guide frames secured to the supporting devices and positioned in planes between the planes occupied by the wheels, each frame having upper and lower guide surfaces with connecting end guides, an endless track mounted on the guide surfaces for movement therealong, the lower run of the track being substantially parallel to the plane of the frame of the truck and having its forward end positioned slightly above the contact point of the wheels and the ground whereby the lower run of the endless belt may contact the high point of an obstruction thereby causing a movement of the endless chain with the weight of the truck and the load thereon carried by the endless chain and the said guide frames.

4. In a hand truck assembly including a truck frame as described and claimed in claim 3, both of the supporting devices having a pivotal connection to the frame of the truck and to the guide frames and retracting means interconnected between the frame adjacent the handles and the rearward supporting devices for retracting the guide frames and due to the pivotal movement moving the guide frames in close proximity to the frame of the truck.

5. In a hand truck assembly as claimed in claim 3, the supporting devices having a rigid connection to the truck frame and also having a substantially rigid connection to the guide frames whereby the endless tracks always occupy the same relative position with reference to the truck frame and the wheels of the truck.

6. In a hand truck assembly as claimed in claim 3, the guide frames having parallel upper and lower surfaces with similar convex end guide surfaces, a pair of peripheral guide grooves on the inside and outside of each guide frame concentric with the guide surfaces, the endless track being provided with a series of individual links pivoted together and certain of the links having pins on opposite sides extending into the guide grooves.

7. In a hand truck assembly as claimed in claim 3, the guide frames having parallel upper and lower guide surfaces with similar convex end guide surfaces, each guide frame having a peripheral groove on its inner and outer face concentric with the guide surfaces, the endless track having a series of individual links with side plates, such side plates being pivoted together and having rollers operate on the guide surfaces, certain of the side plates of the links having pins extending inwardly and engaging in the guide grooves.

8. In a hand truck assembly as claimed in claim 3, each of the supporting devices being constructed in the manner of a pivoted arm with a connecting center plate forming a portion of the arm, each having an axle mounted in the ends of the arms remote from the truck frame, the guide frames being mounted on the ends of said axles, a retracting assembly including a rod connected to the inner axle of the endless track assembly and connected to a hand lever, such lever being pivoted to the frame of the truck adjacent the handles and means to adjust the hand lever to various positions to retract the guide frames and endless track out of operative position and in close contiguity to the truck frame or spaced from such frame in an active operative position.

9. In a hand truck assembly as claimed in claim 3, the supporting devices including a forward and a rear rigid brace, each brace having its upper end rigidly connected to the underside of the truck frame, each brace having a connecting cross plate, the lower ends of each brace having a rigid connection to a guide frame whereby the guide frame always occupies the same position in reference to the truck wheels and the truck frame.

10. In a hand truck of a type having a truck frame, a pair of wheels adjacent one end thereof, a pair of handles adjacent the opposite end and with short legs adjacent the handles, combined with an endless track assembly having guides with the lower run of the track parallel to a line between the contact surface of the wheels and the legs on a level ground, the endless track being slightly above such ground surface whereby when the truck is tilted on the wheels, the endless track may engage the high point of an obstruction and support and truck and load in a movement over such obstruction.

11. In a hand truck as claimed in claim 10, the forward portion of the lower run of the endless track being positioned to overlap along the side of the wheels whereby when the truck is inclined, the load may be transferred from the wheels to the lower run of the endless track and vice versa without substantial deviation from the line of movement of the truck.

12. In a hand truck as claimed in claim 10, the guides for the endless track having a plane surface for the bottom run of the track and a convex curve for the forward return run, the convex curve merging with the flat bottom surface of the guide in an overlap along the side of the wheels whereby the load may be transferred from the wheels to the endless track or vice versa without substantial deviation from a straight line movement of the truck.

13. In a hand truck having a truck frame, two pairs of side plates with a supporting wheel journaled between each pair, the wheels being adjacent one end of the truck and the truck having handles at the other end combined with an endless track assembly including a pair of guides supported from the truck body between the side plates mounting the wheels, the said guides having a plane undersurface and a convex forward end with an endless track operating over said guides whereby the overlap of the endless track along the side of the wheels develops a shift of the support of the load from the wheels to the lower run of the endless belt and vice versa in passing over an obstruction.

14. In a hand truck as claimed in claim 13, the supporting means connecting the guides and the truck body including pivotally mounted arms having a pivotal connection to the truck adjacent the side plates and a second pivoted arm spaced therefrom, said arms having a pivotal connection to the guides of the endless track and means for moving the said arms and the guides of the track to locate the track in different positions relative to the wheels of the truck.

15. In a hand truck including a truck frame with downwardly extending wheel supports with wheels adjacent one end, handles adjacent the opposite end and downwardly extending legs intermediate the wheels and the handles, the combination of an endless track assembly with track laying means connected to the frame and when in operative position having its forward end located to overlap alongside the wheels, the forward end of the track laying means being positioned whereby when the truck is operated with a straight line between the contact surface of the wheels and the lower end of the legs on an inclination to a horizontal plane, the endless track has a clearance from such horizontal plane, the lower run of the endless track being thereby positioned to transfer weight of the truck from the wheels to the lower run of the track.

16. In a hand truck assembly including a truck frame with a downwardly extending pair of wheels adjacent one end, handles at the opposite end and downwardly extending legs between the wheels and the handles, the combination of an endless track assembly with an endless track laying means secured to the frame and when in operative position located with the forward end of the assembly located between the wheels and having an overlap along the inside of the pair of wheels, the lower run of the endless track being positioned whereby when the truck rests on the wheels and the legs on a horizontal plane surface, such lower run is substantially in alignment with such surface, the forward end of the endless track being located when a truck is moved on an inclination to a horizontal plane to have a clearance above such plane whereby on engaging obstructions located between the wheels of the truck the load is transferred to the endless track and the track develops a movement relative to the truck by its engagement with the obstruction and the movement of the truck.

17. In a hand truck assembly including a truck frame with downwardly extending wheels adjacent one end, handles at the other end and downwardly extending legs between the wheels and the handles, the combination of forward and rearward arms connected to the truck frame, an endless track assembly connected to said arms, such assembly having a continuous track laying means with the lower run positioned substantially parallel to a plane between the lower periphery of the wheels and the legs, the endless track assembly having an overlap alongside the wheels.

18. In a hand truck assembly including a truck frame with downwardly extending wheels adjacent one end, handles at the other end and downwardly extending legs between the wheels and the handles, the combination of forward and rearward arms connected to the truck frame, an endless track assembly connected to said arms, such assembly having a continuous track laying means with the lower run positioned substantially parallel to a plane between the lower periphery of the wheels and the legs, the endless track assembly having an overlap alongside the wheels, the said arms having a pivotal connection to the truck frame and means to swing such arms on their pivots to change the position of the endless track assembly.

EDWARD M. HARBERSON.